Nov. 28, 1933.   K. VONDRA   1,937,211
AUTOMATIC CLUTCH FOR MOTOR VEHICLES AND THE LIKE
Filed Jan. 3, 1929
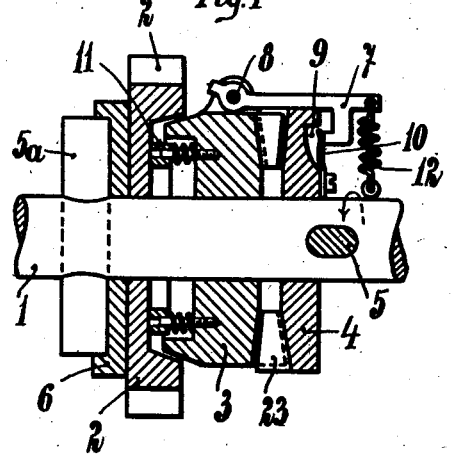
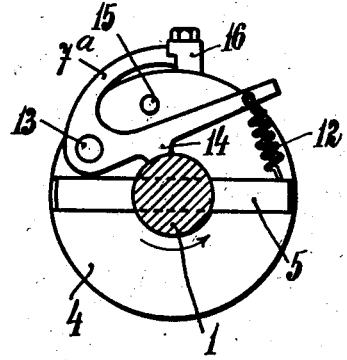
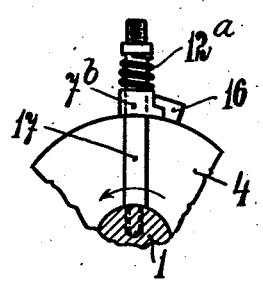
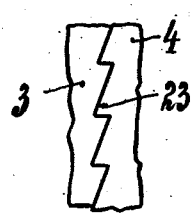
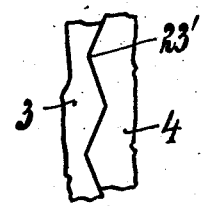
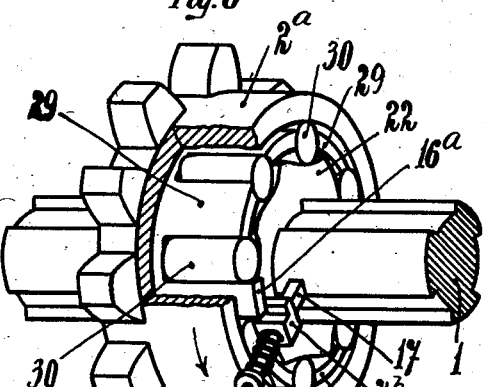
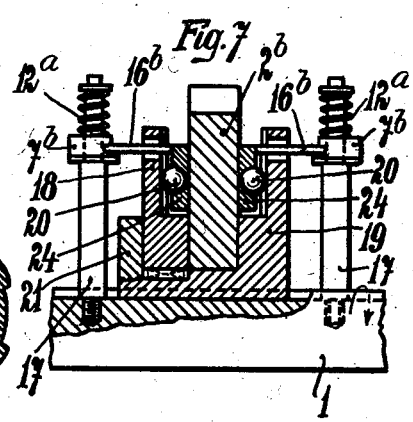
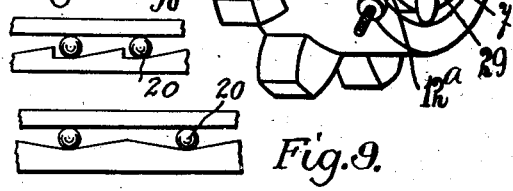
Inventor:
Karel Vondra.

Patented Nov. 28, 1933

1,937,211

UNITED STATES PATENT OFFICE 1,937,211

AUTOMATIC CLUTCH FOR MOTOR VEHICLES AND THE LIKE

Karel Vondra, Kysperk Nad Orlici, Czechoslovakia

Application January 3, 1929, Serial No. 330,073, and in Czechoslovakia November 3, 1928

6 Claims. (Cl. 192—103)

Automatic clutches for use with the speed changing gears of motor vehicles and the like are already known. The known clutches, however, are exceedingly complicated and costly and not very reliable.

The object of the present invention is to produce a simple and reliable automatic clutch, and the invention consists in the employment of a free-wheel clutch which is normally locked by a latch and thrown into action on the latch being released by centrifugal force while the transmission gears are decelerated. The driver of the vehicle will therefore be saved the trouble of synchronizing the gears for changing the speed. It will be sufficient for him to depress the clutch pedal which controls the principal clutch and, on the transmission gear being thus decelerated, the gears appropriate to the speed of the vehicle will then be automatically thrown into operation.

A further advantage of the clutch is that it can be conveniently thrown into operation for braking the vehicle through the medium of the engine and the lowest speed gear in case the ordinary brakes should fail. This action is very rapid and sure and thus increases the safety of the travelling and prevents the risk of breakage of the gear.

The automatic clutch does not come into operation until the pedal which controls the principal clutch is depressed and remains in action, even at a low speed, until the pedal is released, unnecessary wear of the gears being thus prevented.

Fig. 1 of the accompanying drawing represents an axial section of a clutch according to the invention, Figs. 2 and 3 are sectional views showing modifications of this clutch, Figs. 4 and 5 are diagrams of different toothed elements employed in the clutch, Fig. 6 is a perspective view, partly in section, of a clutch employing rollers as clutch elements, Fig. 7 is a half section of a clutch employing clutch balls, and Figs. 8 and 9 are diagrams of toothed elements for operating the balls or rollers of the clutch shown in Fig. 7.

The conical clutch shown in Fig. 1 comprises a driven shaft 1 on which is loosely arranged a toothed driving wheel 2 having on one of its faces a conical recess. A clutch member 3, which is also loose on the shaft, is adapted to engage in the recess of the wheel 2 so as to connect the two elements. For this purpose the clutch member cooperates with a disc 4 which is rigidly secured to the shaft. The clutch member and disc are formed with intermeshing saw-teeth 23 (Fig. 4) which displace the clutch member 3 axially on the shaft and force it into engagement with the wheel 2 when the said clutch member is rotated on the shaft by wheel 2. The clutch member 3 carries, a spring-supported ring 11 which bears against the wheel 2 and tends to transmit rotation between the two elements. The axial displacement of the clutch member is normally limited by a latch 7 which is pivoted at 8 to the clutch member 3 and which has an arm arranged so as to engage over the edge of the disc 4. A nose-piece on the arm of the latch engages in a recess 9 in the disc 4 when the clutch member is displaced owing to the inter-action between it and the disc. A spring 10 on the disc tends to release the latch from the recess in the disc, and a spring 12 tends to retain it for engagement therewith. The tension of the spring 12 is regulated so as to allow the latch to be turned by centrifugal force quite clear of the disc 4 and allow the clutch member 3 to engage the wheel 2 at a given speed of the shaft. The wheel 2 is supported against axial displacement by a disc 6 which, like the disc 4, is secured to the shaft by means of a cotter-pin 5. The teeth 23 may have either of the forms shown in Figs. 4 and 5 according to whether the device is intended to act in both or only in one direction. The teeth 23 are adapted for driving in one direction, and the teeth 23', for driving in either direction.

When the latch 7 is released by centrifugal force and when the wheel 2 moves faster than the shaft 1, the clutch member 3 will be rotatively displaced on the shaft 1 through the medium of the ring 11. At the same time, the teeth 23 bring about an axial displacement of the clutch member so as to throw it into engagement with the wheel 2. While the latch 7 is in operative position, the clutch member is prevented from engaging the wheel 2, and a release of the latch can only be effected when the wheel 2 moves at a lower rate than the shaft and when there is no inter-action between the member 3 and the disc 4 causing the latch to engage in the recess 9. Such a condition can be arrived at by decelerating the transmission gears, the latch being then disengaged from the recess 9 by the spring 10 so as to allow the latch to open by centrifugal force so long as the speed of the shaft is high enough to overcome the resistance of the spring 12.

The latch may be mounted in such a manner that it prevents the disc 3 from turning about the shaft. Fig. 2 shows the operative position of such a latch 7a which is fulcrumed at 13 on the disc 4.

A heel 14 on the latch limits its movement in one direction by abutment against the shaft 1. A stop 15 on the disc 4 limits the movement in the opposite direction. A lug 16 which is undercut and secured to the clutch member 3, overhangs the disc 4 and engages over the reduced end of the latch 7a, if the wheel 2 should move faster than the shaft 1, so as to prevent the latter from turning under the influence of the centrifugal force. An opening of the latch can also in this case be effected by decelerating the transmission gear, in which case the clutch member 3 is turned by the ring 11 so as to release the latch from the lug 16.

Fig. 3 shows the construction wherein a latch 7b is arranged to slide on a prismatic rod 17 secured to the shaft 1.

The latch co-operates, like the latch 7a, with a lug 16 on the clutch member 4 and is moved by centrifugal force, in opposition to a spring 12a, to clear the lug, which can only happen when the shaft 1 moves faster than the driving wheel.

Another method of carrying out the invention is shown in Fig. 6. On the grooved shaft 1 a wide wheel 22 is mounted which is provided with teeth and, between the latter, with surfaces which form less than a right angle with the wheel diameter. This wheel is accommodated in a recess in the free-wheel 2a together with clutch rollers 30 and a cage 29 for the latter. A laterally projecting lug 16a on the cage 29 forms an abutment for a latch of the type shown in Fig. 3. The cage 29 and the rollers 30 are capable of a movement relative to the wheel 22 which corresponds to the overlap of the lug 16a and the latch 7b. When the latch 7b is open and the wheel 2a moves faster than the shaft 1, the clutch rollers 30 roll up the inclined faces of the wheel 22 and clamp the latter to the wheel 2a. The latch 7b is opened out by centrifugal action when the wheel 2a, owing to the deceleration of the transmission gear, moves at less speed than the shaft 1. The rollers 30 are pressed by centrifugal force against the wheel 2a and move the cage 29 and the lug 16a in reverse direction until the latch 7b can open out.

A form of roller or ball clutch wherein axial displacement of the elements takes place is shown in Fig. 7. The driving wheel 2b is rotatably mounted between two discs 18 and 19 on a sleeve secured to the shaft 1. The disc 19 is integral with the sleeve, and the disc 18 is keyed to the sleeve and secured by means of a nut 21. The discs 18 and 19 are recessed at their inner sides and formed with teeth which are shaped as shown in Fig. 8 or 9 and which cooperate with balls 20 fitted in cages 24. Each cage is fitted with a lug 16b which co-operates with a latch 7b as previously described for normally preventing displacement of the cage 24 and engagement of the clutch. In order that the cage and the balls may follow the wheel 2 when the latter moves at less speed than the shaft 1, the wheel and cage are frictionally engaged.

For use in a motor vehicle the clutch and the centrifugal latch therefor are applied to all the higher transmission gears. These gears, which are represented by the wheel 2, remain in constant mesh with the corresponding driving gears on a lay-shaft and are automatically thrown into operation on deceleration of the lay-shaft by taking out the main clutch and on the consequent release of the respective centrifugal latch. While one clutch is in operation the clutches of the higher gears remain locked by their centrifugal latches, and the clutches of the lower gears act as free-wheel clutches. In the lowest gear the centrifugal latch is absent, and the clutch will therefore always engage as soon as the lay-shaft begins to move. This clutch is moreover bi-directional and for this purpose provided with teeth such as illustrated in Fig. 5 or 9 so that it can be used for reversing and for braking the vehicle through the medium of the engine.

I claim:

1. An automatic clutch for motor vehicles and the like comprising a shaft, a wheel arranged loosely on said shaft, a clutch member on the shaft adapted for engagement with said wheel on axial displacement thereof, said clutch member being formed with an annular row of teeth, a disc mounted rigidly on the shaft and formed with teeth adapted to mesh with the teeth of the clutch member so as to force the latter axially into engagement with the wheel on a rotary displacement of the clutch member relative to the disc, a friction element arranged between the clutch member and the wheel so as to transmit initial rotary motion from the wheel to the clutch member, and a latch tending normally to limit displacement of the clutch member and prevent its engagement with the wheel, said latch being adapted to be released by centrifugal force.

2. An automatic clutch for motor vehicles and the like, comprising a pair of co-axial clutch members, one of said members being axially displaceable for inter-engagement with the other member, means tending to urge the clutch members into engagement, a centrifugal, spring-controlled latch carried by said displaceable clutch member, and an abutment co-operating with said latch so as to prevent inter-engagement of the clutch members unless said displaceable clutch member rotates at more than a pre-determined speed.

3. The clutch claimed in claim 1 in combination with means for preventing the release of the latch while there is inter-action between the clutch member and the disc.

4. A clutch as claimed in claim 1 wherein the latch is pivoted to the clutch member and has an arm whereby it engages over the edge of the disc, and a nose-piece on said arm adapted to engage in a recess in the disc on the clutch member being displaced by inter-action with the disc and to prevent the release of the latch so long as such inter-action exists.

5. An automatic clutch for motor vehicles and the like comprising a shaft, a freely rotatable clutch element on said shaft, a second clutch element adapted for limited movement on said shaft, means tending to displace said second clutch element from a neutral position and effect engagement between it and the freely rotatable clutch element on the latter being rotated relative to the shaft, a centrifugal, spring-controlled latch rotating together with the shaft and adapted normally to prevent such displacement of the second clutch element and to release it for displacement when rotated at more than a predetermined speed, and means for preventing the release of said second clutch element until the shaft moves faster than the freely rotatable clutch element in a given direction.

6. An automatic clutch for motor vehicles and the like, comprising a shaft, a freely rotatable clutch element from said shaft, a clutch element, fixed to said shaft, a ball cage arranged rotatably between said clutch elements, balls in said cage adapted to get clamped between the rotatable clutch element and inclined faces on the fixed clutch element on rotary displacement taking place between the cage and the fixed clutch element, means tending to effect such displacement of the cage under the influence of the rotatable clutch element, a lug on the cage, and a centrifugal, spring-controlled latch normally engaging said lug to prevent rotary displacement of the cage and adapted to release the cage for displacement when rotated at more than a predetermined speed, said lug and latch adapted to interlock to prevent the release of the cage unless the shaft moves faster than the rotatable clutch element.

KAREL VONDRA.